United States Patent
Plumb et al.

(10) Patent No.: US 10,223,363 B2
(45) Date of Patent: Mar. 5, 2019

(54) ACCESS CONTROL BASED ON OPERATION EXPIRY DATA

(71) Applicant: Microsoft Technology Licensing, LLC, Redmond, WA (US)

(72) Inventors: Graham Charles Plumb, London (GB); Warren Leslie Keyes, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 680 days.

(21) Appl. No.: 14/529,063

(22) Filed: Oct. 30, 2014

(65) Prior Publication Data

US 2016/0124974 A1    May 5, 2016

(51) Int. Cl.
*G06F 17/30* (2006.01)
*G06F 21/62* (2013.01)

(52) U.S. Cl.
CPC .... *G06F 17/30082* (2013.01); *G06F 21/6218* (2013.01); *G06F 2221/21* (2013.01); *G06F 2221/2111* (2013.01); *G06F 2221/2137* (2013.01)

(58) Field of Classification Search
CPC .................................................. G06F 17/30082
USPC ......................................................... 707/689
See application file for complete search history.

(56) References Cited

U.S. PATENT DOCUMENTS

| | | | |
|---|---|---|---|
| 6,381,602 B1 | 4/2002 | Shoroff et al. | |
| 6,766,348 B1 | 7/2004 | Combs et al. | |
| 7,092,943 B2 | 8/2006 | Roese et al. | |
| 7,293,027 B2 * | 11/2007 | Margolus | .......... G06F 17/30368 |
| 7,590,807 B2 * | 9/2009 | McGovern | ............ G06F 3/0623 |
| | | | 707/999.202 |
| 7,680,830 B1 * | 3/2010 | Ohr | ................... G06F 17/30085 |
| | | | 707/999.2 |
| 7,801,894 B1 | 9/2010 | Bone et al. | |
| 7,809,800 B2 | 10/2010 | Kim et al. | |
| 8,055,628 B2 * | 11/2011 | Margolus | .......... G06F 17/30368 |
| | | | 707/663 |

(Continued)

FOREIGN PATENT DOCUMENTS

EP        0715243        6/1996

OTHER PUBLICATIONS

"International Search Report and Written Opinion Issued in PCT Application No. PCT/US2015/057433", dated Jan. 22, 2016, 11 Pages.

(Continued)

*Primary Examiner* — Jean M Corrielus
(74) *Attorney, Agent, or Firm* — Workman Nydegger

(57) ABSTRACT

The controlling of access to a file system entity based on location of the requestor and operation expiry data of the file system entity. Operation expiry data and location data are associated with a file system entity (e.g., a file, a directory, a partition, or a disk) such that the file system entity and the operation expiry data and the location data are moved or copied atomically together. Upon receiving a request to perform an operation on the file system entity, the system identifies a location status of the requestor. The system then identifies expiry data that corresponds to the location status, and that is associated with the requested operation. The system then uses the identified expiry data to determine whether or not the requested file operation is to be permitted.

19 Claims, 6 Drawing Sheets

(56) References Cited

U.S. PATENT DOCUMENTS

| | | | |
|---|---|---|---|
| 8,280,958 | B2 | 10/2012 | Chavez et al. |
| 8,312,064 | B1 | 11/2012 | Gauvin |
| 8,613,108 | B1 | 12/2013 | Aggarwal |
| 8,656,454 | B2 | 2/2014 | Gunawardena et al. |
| 8,805,956 | B1 | 8/2014 | Yang et al. |
| 2002/0177449 | A1 | 11/2002 | McDonnell et al. |
| 2004/0167935 | A1* | 8/2004 | Margolus .......... G06F 17/30368 |
| 2004/0167939 | A1* | 8/2004 | Margolus .......... G06F 17/30368 |
| 2005/0097260 | A1* | 5/2005 | McGovern ............ G06F 3/0623 711/100 |
| 2006/0036875 | A1* | 2/2006 | Karoubi .............. G06F 21/6263 713/191 |
| 2006/0117010 | A1 | 6/2006 | Hakala et al. |
| 2007/0118687 | A1* | 5/2007 | McGovern ............ G06F 3/0623 711/112 |
| 2007/0250627 | A1 | 10/2007 | May et al. |
| 2008/0177994 | A1 | 7/2008 | Mayer et al. |
| 2008/0281908 | A1* | 11/2008 | McCanne ......... G06F 17/30156 709/203 |
| 2009/0043881 | A1* | 2/2009 | Alstad ................. G06F 12/0813 709/224 |
| 2009/0271586 | A1 | 10/2009 | Shaath et al. |
| 2010/0146272 | A1* | 6/2010 | Centonza ............. H04W 28/02 713/168 |
| 2011/0179483 | A1* | 7/2011 | Paterson ................. G06F 21/53 726/22 |
| 2011/0247074 | A1 | 10/2011 | Manring et al. |
| 2012/0078643 | A1 | 3/2012 | Nagpal et al. |
| 2012/0198570 | A1 | 8/2012 | Joa et al. |
| 2013/0275391 | A1* | 10/2013 | Batwara ............ G06F 17/30085 707/689 |
| 2013/0297662 | A1 | 11/2013 | Sharma et al. |
| 2013/0339404 | A1 | 12/2013 | Chao et al. |
| 2013/0340093 | A1* | 12/2013 | Reinertsen .............. G06F 21/10 726/28 |
| 2014/0181864 | A1 | 6/2014 | Marshall et al. |
| 2014/0181998 | A1* | 6/2014 | Hunt ..................... H04W 12/08 726/30 |
| 2015/0089673 | A1 | 3/2015 | Beckman et al. |
| 2015/0135300 | A1* | 5/2015 | Ford ................... H04L 67/1097 726/11 |
| 2015/0347447 | A1* | 12/2015 | Ho .................... G06F 17/30174 707/622 |
| 2016/0124987 | A1 | 5/2016 | Plumb |
| 2016/0125195 | A1 | 5/2016 | Plumb |

OTHER PUBLICATIONS

Lotspiech, et al., "Cryptographic Containers and the Digital Library", In Verlaessliche IT-Systeme, Jan. 1, 1997, pp. 33-48.
"The Digital Property Rights Language—Manual and Tutorial—XML Edition", Retrieved from <<http://web.archive.org/web/20010425194729/http://xml.coverpages.org/DPRLmanual-XML2.html>>, Nov. 13, 1998, 64 Pages.
"International Search Report and Written Opinion Issued in PCT Application No. PCT/US2015/057435", dated Jan. 20, 2016, 11 Pages.
"International Search Report and Written Opinion Issued in PCT Application No. PCT/US2015/057438", dated Jan. 29, 2016, 11 Pages.
Office Action dated Nov. 6, 2015 cited in U.S. Appl. No. 14/529,067.
Perlman, "File System Design with Assured Delete", Third IEEE International Security in Storage Workshop, Dec. 2005, SISW'05, 7 pages.
Notice of Allowance dated May 5, 2016 cited in U.S. Appl. No. 14/529,067.
"Second Written Opinion Issued in PCT Application No. PCT/US2015/057433", dated Sep. 30, 2016, 5 Pages.
International Preliminary Report on Patentability issued in PCT Application No. PCT/US2015/057438, dated Jan. 16, 2017.
International Preliminary Report on Patentability issued in PCT Application No. PCT/US2015/057433, dated Jan. 3, 2017.
Office Action dated Jul. 7, 2017 cited in U.S. Appl. No. 14/529,049.
"Database Vault Administrator's Guide Contents", Accessed Oct. 3, 2017. Available at http://docs.oracle.com/cd/B28359 01/server.111/b3122/toc.htm.
"Oracle Database", Published Mar. 2008. Available at http://docs.oracle.com/cd/B28359 01/server.111/b28310/title.htm.
"1 Introducing Oracle Database Vault", Accessed Oct. 3, 2017. Available at http://docs.oracle.com/cd/B28359 01/server.111/b31222/dvintro.htm#DVADM70088.
"1 Introduction to Oracle Database Vault", Accessed Oct. 3, 2017. Available at http://docs.oracle.com/database/121/DVADM/dvintro.htm#DVADM70088.
"Restricting Command Execution Using Oracle Database Vault", Accessed Oct. 3, 2017. Available at http://docs.oracle.com/ocom/groups/public/@otn/documents/webcontent/279052.htm.
"3 Getting Started with Oracle Database Vault," Accessed Oct. 3, 2017. Available at https://docs.oracle.com/database/121/DVADM/getting_started_htm#DVADM71415.
"Oracle Database Vault: DBA Administrative Best Practices," Published May 2015. Available at http://www.oracle.com/technetwork/database/security/twp-databasevault-dba-bestpractices-199882.pdf.
Office Action dated Dec. 5, 2017 cited in U.S. Appl. No. 14/529,063.
Cho, et al., "Secure Access Control for Location-Based Applications in WLAN Systems", In 3rd IEEE International Conference on Mobile Ad Hoc and Sensor Systems, Oct. 2006, 12 pages.
"Cloud Files: FAQs", Published on: Oct. 14, 2012, Available at: http://www.rackspace.com/knowledge_center/product-faq/cloud-files.
Abdelmajid, et al., "Location-Based Kerberos Authentication Protocol", In Proceedings of IEEE Second International Conference on Social Computing, Aug. 20, 2010, 6 pages.
"2.2.4.53.1 Request", Retrieved on: Sep. 3, 2014, Available at: http://msdn.microsoft.com/en-us/library/ee441849.aspx.
"3.2.1.3 Per SMB Session", Published on: Dec. 29, 2013, Available at: http://msdn.microsoft.com/en-us/library/ee442044.aspx.
"2.2.4.53 SMB_COM_Session_Setup_ANDX (0x73)", Published on: Dec. 23, 2013, Available at: http://msdn.microsoft.com/en-us/library/ee442101.aspx.
Peterson, et al., "A Position Paper on Data Sovereignty: The Importance of Geolocating Data in the Cloud", In Proceedings of the 3rd USENIX conference on Hot topics in cloud computing, Jun. 14, 2011, 5 pages.
"Cloud Files: FAQs", Published on: Jan. 27, 2013, Available at: http://www.rackspace.com/knowledge_center/product-faq/cloud-files.
"Final Office Action Issued in U.S. Appl. No. 14/529,049", dated Sep. 12, 2018, 33 Pages.

* cited by examiner

ACCESS CONTROL BASED ON OPERATION EXPIRY DATA

BACKGROUND

Computing systems and associated networks have revolutionized the way human beings work, play, and communicate. Nearly every aspect of our lives is affected in some way by computing systems. The proliferation of networks has allowed computing systems to share data and communicate, vastly increasing information access. For this reason, the present age is often referred to as the "information age".

However, in some cases, it is desirable to restrict access to data. For instance, data is often restricted so that it is only accessible by certain individuals. Those individuals must therefore authenticate before accessing the data. In other circumstances, data is to be restricted based on location. For instance, some data is to be confined within certain geographical territory. Confinement of data to a particular geographic region may be performed for a variety of reasons, such as legal, regulatory, tax or safety reasons. In some cases, data has a certain expiry associated with the data, so as to restrict when the data may be used.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the controlling of access to a file system entity based on location of the requestor and operation expiry data of the file system entity. Operation expiry data and location data are associated with a file system entity (e.g., a file, a directory, a partition, or a disk) such that the file system entity and the operation expiry data and the location data are moved or copied atomically together. Upon receiving a request to perform an operation on the file system entity, the system identifies a location status of the requestor. The system then identifies expiry data that corresponds to the location status, and that is associated with the requested operation. The system then uses the identified expiry data to determine whether or not the requested file operation is to be permitted.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the controlling of access to a file system entity based on location of the requestor and operation expiry data of the file system entity. Operation expiry data and location data are associated with a file system entity (e.g., a file, a directory, a partition, or a disk) such that the file system entity and the operation expiry data and the location data are moved or copied atomically together. Upon receiving a request to perform an operation on the file system entity, the system identifies a location status of the requestor. The system then identifies expiry data that corresponds to the location status, and that is associated with the requested operation. The system then uses the identified expiry data to determine whether or not the requested file operation is to be permitted. In some embodiments, the identified expiry data for that location status lists expires of operations themselves, such that one operation might have a different expiry than another, even for the same requestor location status, and for the same file system entity being operated upon. Some introductory discussion of a computing system will be described with respect to FIG. 1. Then, the structure and use of access control will be described with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
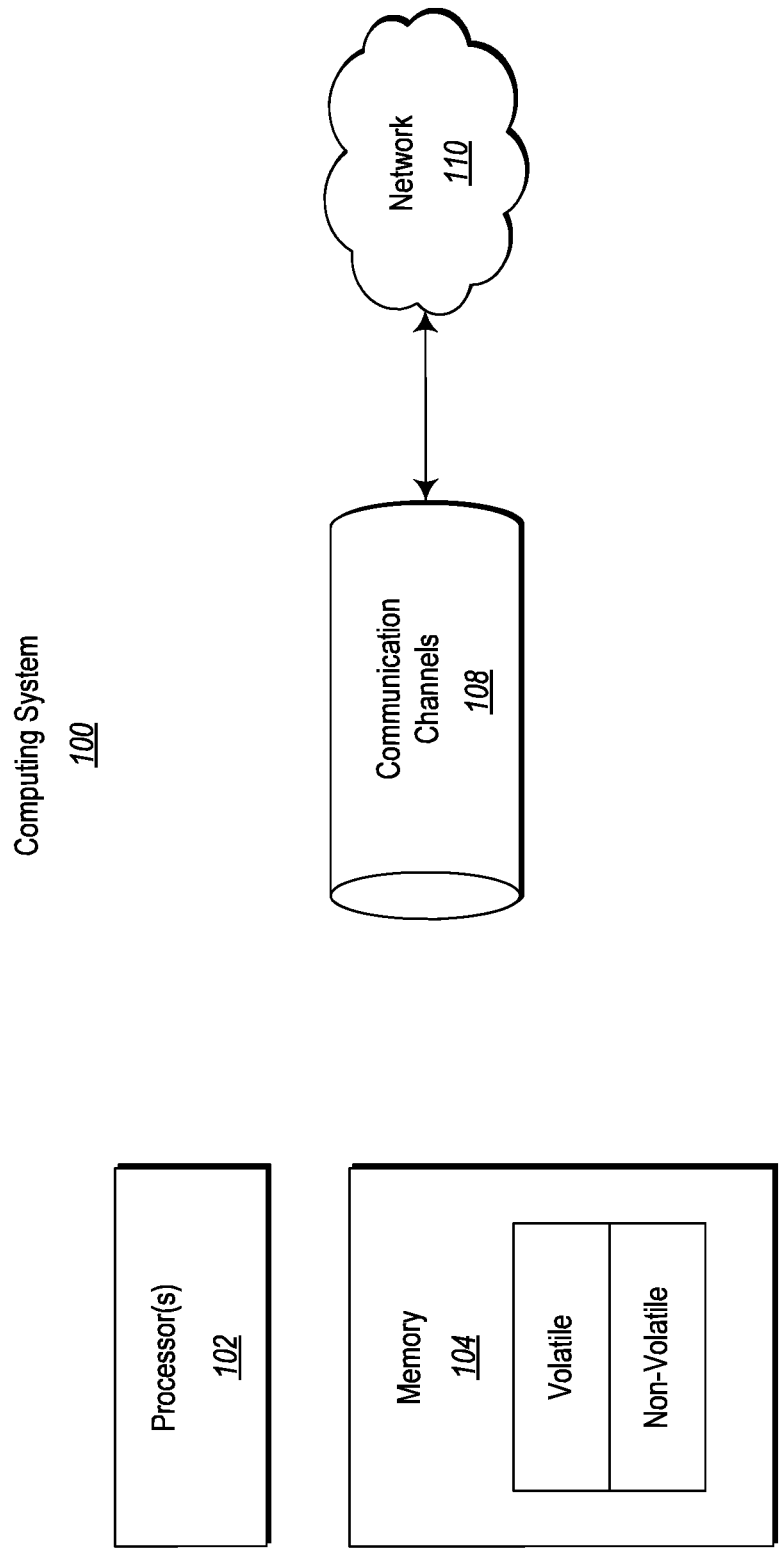
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110. The computing system 100 also includes a display, which may be used to display visual representations to a user.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
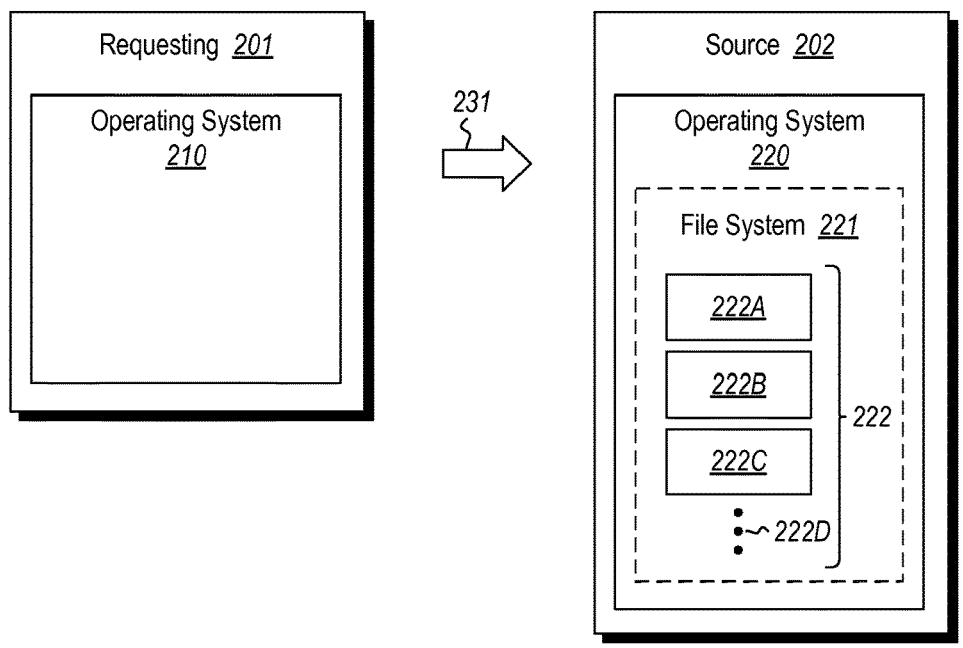
FIG. 2 illustrates a system in which a requesting system requests to perform an operation on a file system entity that is within a file system of a source system.

FIG. 2 illustrates a system 200 that includes a requesting system 201 and a source system 202. In particular, the requesting system 201 submits a request 231 to the source system 202 to perform an operation on a file system entity of the source system 202. Examples of such operations might include, for instance, read operations, update operations, copy operations, and delete operations. The file system entity might be, for example, a disk, a partition, a directory, or the most basic file system entity—a file.

The requesting system 201 may be a computing system, in which case the requesting system 201 and may be structured as described above for the computing system 100 of FIG. 1. If a computing system, the requesting system 201 operates thereon an operating system 210. The source system 202 includes an operating system 220 that maintains a file system 221 constituting multiple file system entities 222. For instance, the file system 221 is illustrated as including multiple file system entities 222 including file system entity 222A, file system entity 222B, file system entity 222C, amongst potentially many other file system entities as represented by the ellipses 222D. The source system 202 may likewise be structured as described above for the computing system 100 of FIG. 1.

Figure 3:
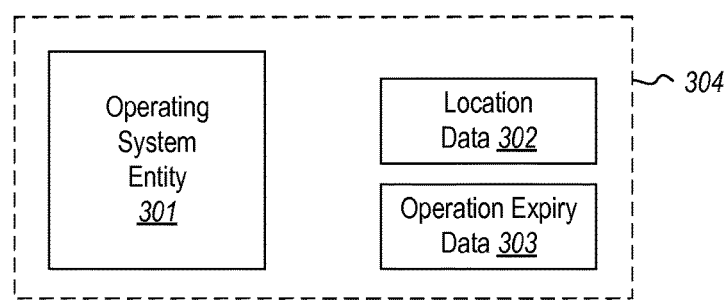
FIG. 3 illustrates a file system entity environment in which the file system entity and corresponding location data and operation expiry data are associated in such a way that if the file system entity is copied or moved, the corresponding location data and operation expiry data are also atomically copied or moved, respectively.

FIG. 3 illustrates a file system entity environment 300. The file system entity environment 300 includes a file system entity 301 as well as location data 302 and operation expiry data 303. Furthermore, the location data 302 and the operation expiry data 303 are associated with the file system entity 301 as represented by the dashed box 304. This association 304 is such that the file system entity 301, the location data 302 and the operation expiry data 303 are moved or copied atomically together. As an example, the file system entity 301 might be any of the file system entities 222 of FIG. 2. A similar file system entity environment 300 may be provided for each of multiple file system entities, such that the file system entity has associated location data and operation expiry data that are atomically moved or copied with the file system entity if the file system entity is moved or copied, respectively.

The association 304 may differ depending on the file system. In one example, in which the file system entity is a file, the association 304 is accomplished by including the location data and operation expiry data within an alternate data stream of the file. Such might be appropriate for instance, in a New Technology File System (NTFS)-based file system. As another example, the association 304 may be accomplished by including the location data and operation expiry data as one or more properties of the file system entity. For instance, in inode-based file systems such as XFS, ZFS and Reiser4, this location data and operation expiry data may be stored against a file using extended file properties.

For file systems which do not provide an extension to a given file system entity entry's content (such as FAT16, FAT32 and ExFAT), a fallback approach may be used where the location data and operation expiry data is written to a separate file in the same directory as the file system entity (e.g., using an appropriate extension). While this is not as robust as the other approaches, it does offer some level of interoperability for legacy systems—although location-based data access enforcement and operation expiry based access enforcement will be at the mercy of the consuming operating system.

It is not important to the principles described herein how the association 304 is made between the file system entity 301 and the location data 302 and operation expiry data 303. Suffice it to say that regardless of how the association is made, the association is compatible with the underlying file system or environment, and is made such that if the file system entity 301 is moved or copied, so is the location data 302 and operation expiry data 303.

Figure 4:
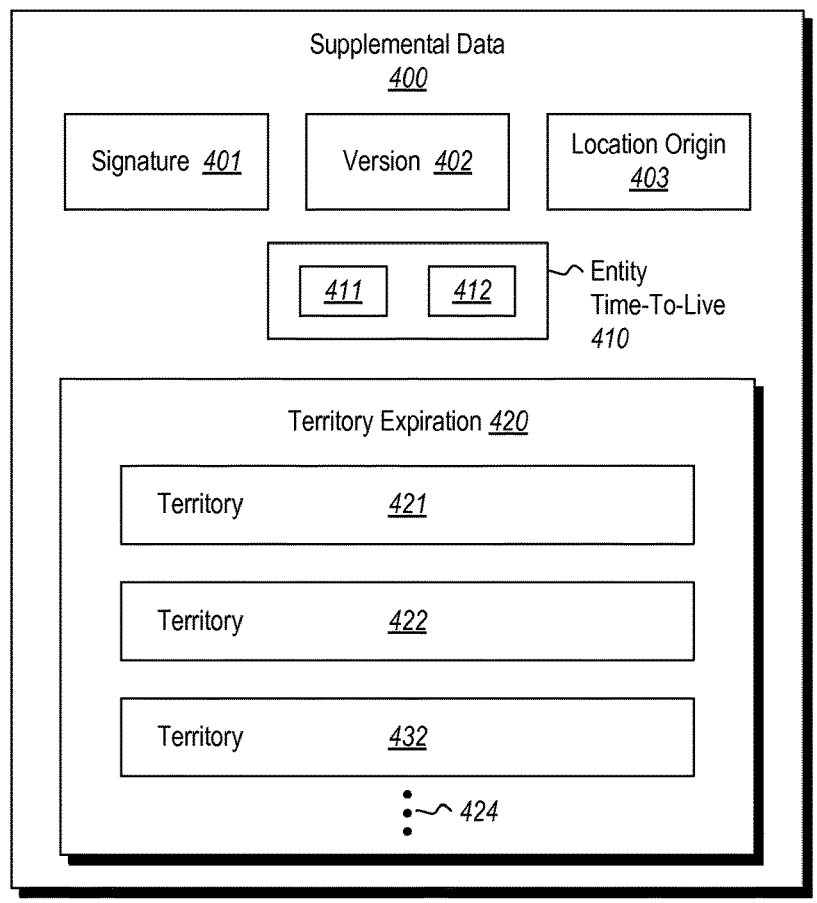
FIG. 4 illustrate supplemental data that represents an example of the location data and the operation expiry data of FIG. 3.

FIG. 4 illustrate supplemental data 400 that represents the location data 302 and the operation expiry data 303 of FIG. 3. The supplemental data 400 includes various fields that are examples of what might be included in various embodiments. There is no requirement that the location data 302 or the operation expiry data 303 described herein include all, or even some, of the fields described for the supplemental data 400.

The supplemental data 400 includes a signature 401 that perhaps allows metadata to be identified as pertaining to time-restricted access. A version field 402 might identify the version number so as to allow advancement of the principles described herein. A location origin field 403 may identify a region at which the file system entity originated. This might be useful in situations in which access or operation expiry may depend on whether the location of the requestor is the same territory that originated the file system entity.

The supplemental data 400 also includes an entity time-to-live field 410 which, if present, may be used to define a time-to-live of the file system entity itself, regardless of location status of the requestor. In one example, the time-to-live field 410 may include a file expiry field 411 and a delete indicator 412. For instance, the file expiry field 411 might be an unsigned long, and the delete indicator 412 might be a Boolean.

When evaluated, as an example only, a negative value in the signed long 411 indicates that the corresponding file system entity has already expired, and is only eligible for deletion operations. The Boolean 412 represents whether or not the file system entity is to be deleted automatically if the file system entity is found to have expired. In this example, a zero value in the signed long 411 indicates that the file system entity currently does not have an expiry time. A positive value in the signed long 411 indicates an expiry time, that may be compared with the current time, to determine whether or not the file system entity has expired. Again, if the signed long 411 is used to indicate that the file system entity has expired, the Boolean 412 is evaluated to determine whether or not the file system entity is to be deleted automatically upon detection that the file system entity has expired.

The supplemental data 400 also includes a territory expiration field 420. In one example, at least one of (and potentially both of) the file time-to-live field 410 and the territory expiration field 420 is to exist within the supplemental data 400. The territory expiration field 420 includes multiple territory fields, each for a corresponding territory. For instance, the territory expiration field 420 is illustrated as including three territory fields 421, 422 and 423. However, the ellipses 424 symbolically represent that there may be any number of territory fields within the territory expiration field 420. As an example, each territory field (421 through 424) might identify the corresponding country using any means. Examples of such identifies might include a United Nations country code. In one embodiment, one of the territory field is a default territory field that is applied if the location status of the requestors is unknown or not present within any of the other territories for which there is a territory field.

Figure 5:
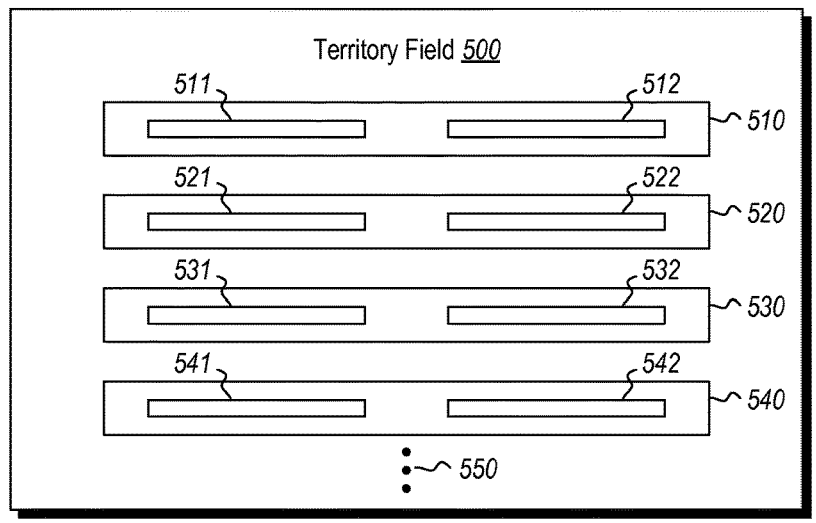
FIG. 5 abstractly illustrates a territory field that represents an example of any of the territory fields of FIG. 4.

FIG. 5 abstractly illustrates a territory field 500 that represents an example of any of the territory fields 421 through 424 of FIG. 4. The territory field 500 includes multiple operation fields. In particular, the territory field 500 is illustrated as including four operation fields 510, 520, 530 and 540. However, the ellipses 550 represent that there may be any number of operation fields within the territory field. Examples of operations might include read, copy, update, and delete. Each operation expiry field 510, 520, 530 and 540 includes a respective operation expiry indicator field 511, 521, 531 and 541, respectively, and a delete indicator field 512, 522, 532 and 542, respectively. If a request comes in which indicates that the requestor has a location status corresponding to one of the territories represented in the territory expiration field 420, then the requested operation is identified to determine which operation expiry field of the respective territory field (e.g., 421 and 500) to use to define whether the operation is permitted, or no longer permitted. Again, in one embodiment, each operation expiry indicator field 511, 521, 531 and 541 may be an unsigned long, and each delete indicator field 512, 522, 532 and 542 may be a Boolean.

When evaluated, a negative value in the signed long for the respective operation expiry indicator field 510, 520, 530, 540 indicates that the operation for the corresponding file system entity has already expired given the requestors' location status, and is only eligible for deletion operations if permitted given the requestors' location status. The Boolean represents whether or not the file system entity is to be deleted automatically if the file system entity is found to have expired. In this example, a zero value in the signed long indicates that the respective operation on respective file system entity currently does not have an expiry time given the requestors' location status. A positive value in the signed long indicates an expiry time that may be compared with the current time to determine whether or not the respective operation for the file system entity has expired given the requestors' location. Again, if the signed long is used to indicate that the operation on the file system entity has expired given the requestors' location, the Boolean is evaluated to determine whether or not the file system entity is to be deleted automatically.

Figure 6:
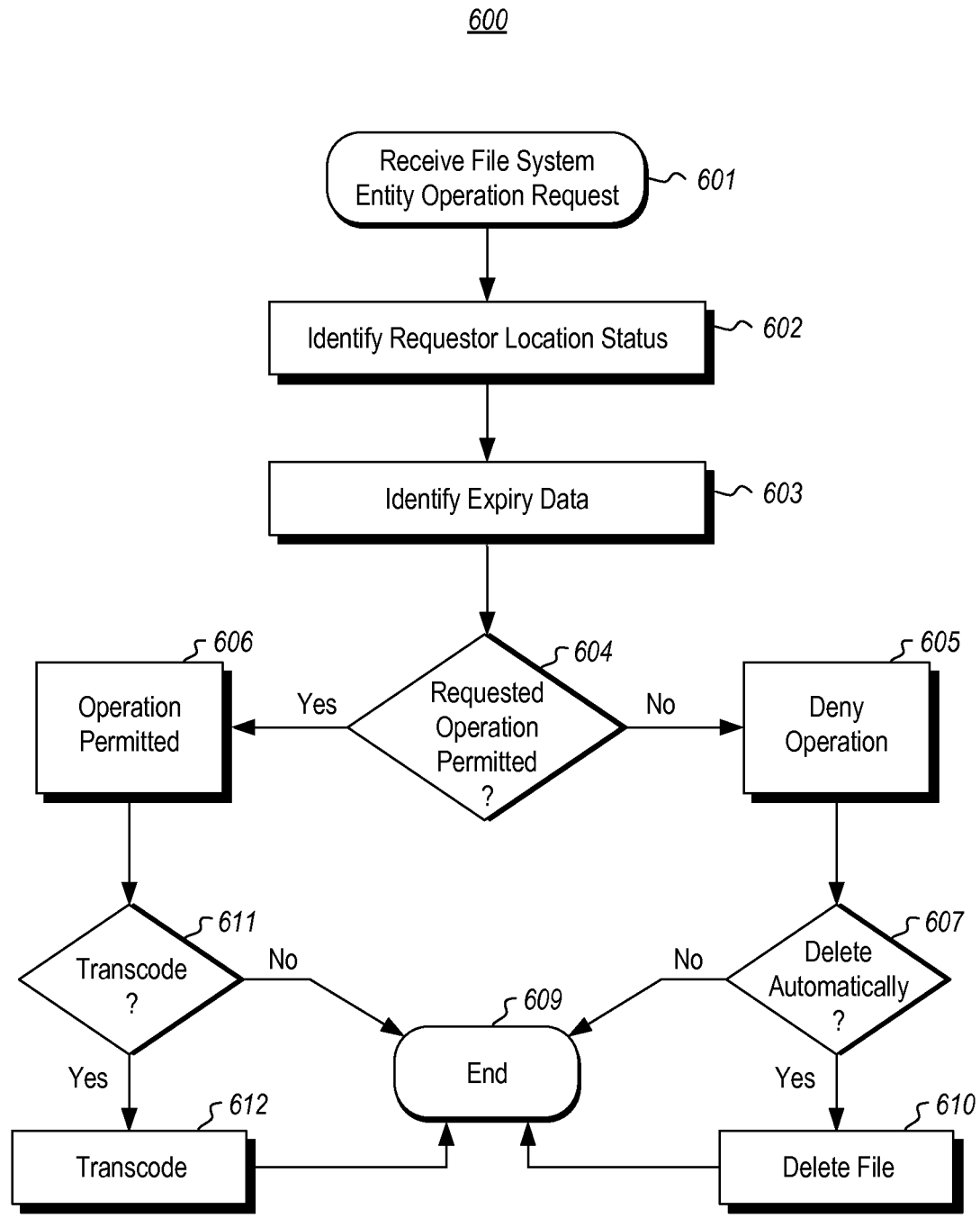
FIG. 6 illustrates a flowchart of a method for controlling access to data based on location of the requestor and operation expiry data.

FIG. 6 illustrates a flowchart of a method 600 for controlling access to data based on location of the requestor and expiry data. The method 600 may be performed by, for example, the source system 202 in order to control access to one of more of the file system entities 222 within its file system 221. Accordingly, the method 600 may be described with frequent reference to the FIG. 2 as an example.

The method 600 is initiated upon the source system receiving a request to perform an operation on the file system entity (act 601). For instance, in FIG. 2, the source system 202 receives the request 231 from the requesting system 201. For instance, suppose the request 231 is to perform a read operation upon the file system entity 222A.

The source system then identifies a location status associated with the requestor that issued the request (act 602). For instance, in FIG. 2, the source system 202 would determine the location status of the requesting entity 201. The location status might be "unknown" in cases in which the location of the requestor is not able to be determined. The location status might also be a particular location or territory where the requestor is presently located.

Then, the source system identifies expiry data (act 603) that corresponds to the location status, and that is associated with the requested operation. For instance, referencing FIG. 2, suppose that the file system entity 222A is requested to be operated upon, and that the file system entity 222A includes a file system entity environment 300 of FIG. 3. In that case, the appropriate supplemental data (represented as supplemental data 400 of FIG. 4) may be accessed (e.g., de-serialized). Given the location status, the appropriate territory field (e.g., 421, 422, 423) of the supplemental data 400 may be located. Furthermore, given the requested operation, the appropriate operation field (e.g., 510, 520, 530 or 540 if the territory field 500 applies) is located.

The identified expiry data is then used to determine whether the requested operation is permitted on the file system entity (decision block 604). For instance, as indicated above, if ("No" in decision block 604) the unsigned long (e.g., field 511) of the operation field (e.g., field 510) is negative or the current time is after the time represented in the operation field, then the requested operation is denied (act 605). For instance, this might involve the source system preventing the operation on the file system entity. On the other hand ("Yes" in decision block 604), if the unsigned long 511 of the operation field 510 is zero or the current time is before the time represented in the operation expiry field, then the requested operation is permitted (act 606).

If the operation is denied ("No" in decision block 604), the delete upon expiry field (e.g., 512) of the operation field (e.g., 510) is used to determine whether the file system entity is to be deleted automatically (decision block 607). If so ("Yes" in decision block 607), the file system entity is deleted (act 610). Otherwise, the method ends (act 609) for the requested operation. The file system entity remains, but the request to operate thereon has nonetheless been denied.

In the case of the requested operation being permitted ("Yes" in decision block 604), the method 600 may further include causing the requested operation to be performed on the file system entity. The source system might then determine whether or not the file system entity should be transcoded so as to be compatible with the operating system 210 of the requesting system 201 (decision block 611). In the case of the file system operation being a delete, read or update operation, perhaps no transcoding is necessary ("No" in decision block 611), and the method ends (act 609).

However, in the case of a copy operation ("Yes" in decision block 611), the copied version of the file system entity might be transcoded (act 612), depending on whether the file system entity environment 300 is the same between the operation systems 210 and 220. If they are not the same, then transcoding is performed so that the location data 302, the operation expiry data 303 (i.e., the supplemental data 400) and the file system entity 301 are associated 304 in a manner suitable for the operating system 210 of the requesting entity, or the ultimate operating system in which the requestor is to use the file system entity. For instance, the copy of the file system entity might have the supplemental data copied from an alternate data stream (if not recognized by the operating system 210) to a file property. In addition, serialization formats might be changed. If the file system entity is serialized in a manner in the source operating system 220 that is not recognized by the requesting operating system 210 (or the operating system in which the requestor intends to use the file system entity), then transcoding in the form or re-serialization might be performed.

Figure 7:
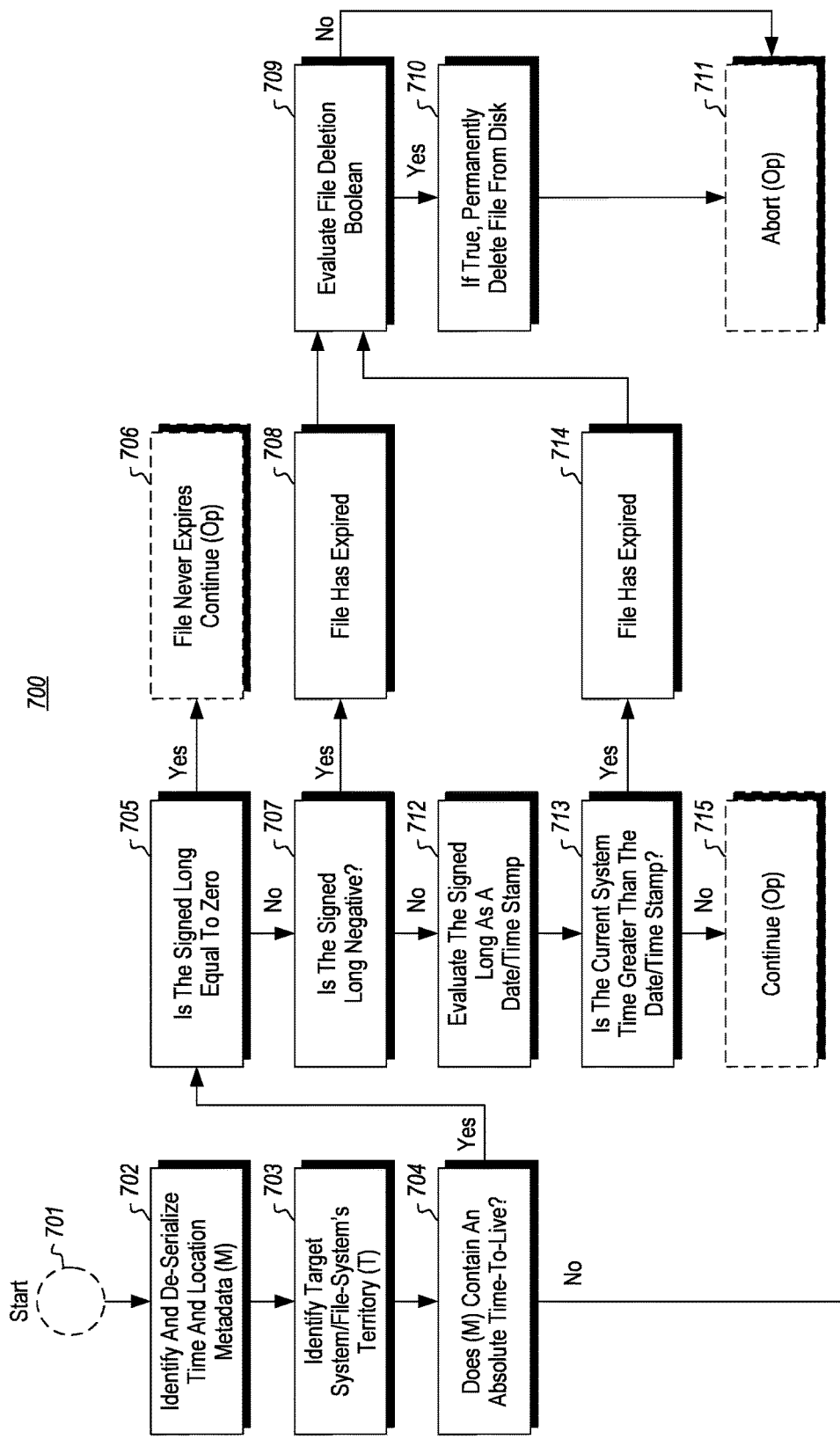
FIG. 7 illustrates a more specific method for controlling access to a file system entity based on the location status of the requestor and based on operation-specific expiry data.
Figure 7:
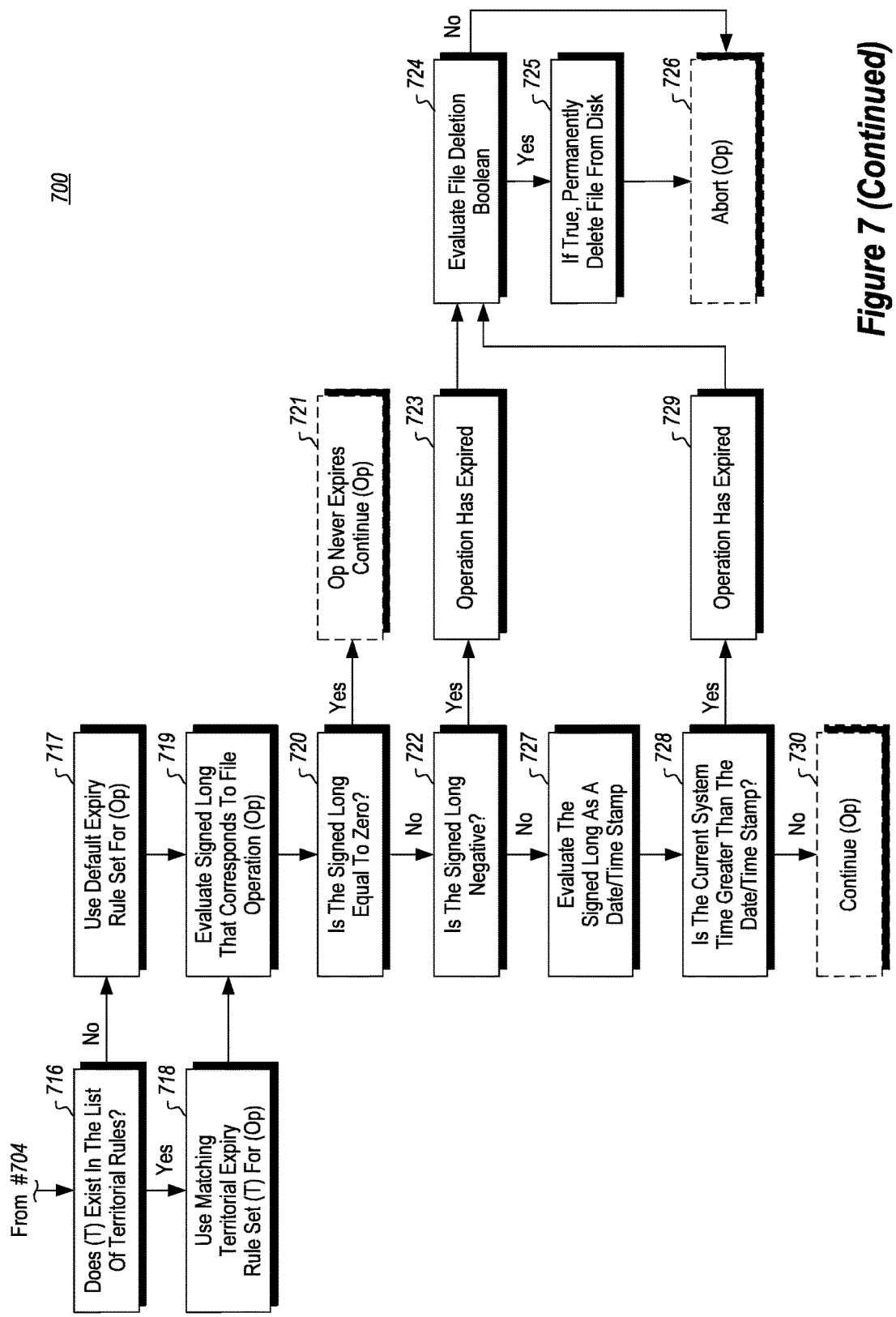

FIG. 7 illustrates a more specific method 700 for controlling access to a file system entity based on the location status of the requestor and based on operation-specific expiry data. Upon receiving the request (act 701), the method 700 is initiated. The supplemental data 400 (referred to in FIG. 7 as "time and location metadata (M)") for the corresponding file system entity is then accessed (act 702). This might involve de-serializing the supplemental data 400.

The location status of the requestor is then determined (act 703). Act 703 is an example of act 602 of FIG. 6. The location status might be "unknown" in the case in which the location of the requestor cannot be determined.

It is then determined whether or not there is any entity time-to-live data (e.g., the field 410 is validly populated) in the supplemental data 400 (act 704). If there is ("Yes" in decision block 704), the method 700 engages in acts 705 through 715 (some of which being conditional), which have not been described above with respect to FIG. 6.

Specifically, if the signed long for the entity time-to-live data is equal to zero ("Yes" in decision block 705)), this means the file system entity never expires, and thus the operation is permitted (act 706). On the other hand ("No" in decision block 705), if the signed long is negative ("Yes" in decision block 707), then it is determined that the file system entity has already expired (act 708). In that case, the file delete indicator 412 is evaluated (decision block 709). If that Boolean is true ("Yes" in decision block 709), then the file system entity is deleted from disk (act 710), and the operation is aborted (act 711). Otherwise, if the Boolean is false ("No" in decision block 709), then the operation is aborted (act 711) without deleting the file system entity (bypassing act 710).

If the signed long is neither zero ("No" in decision block 705), and is not negative ("No" in decision block 707), then the signed long is evaluated as a date/time stamp (act 712). An example of a date/time stamp is a Unix date/time stamp.

If the current time is greater than the date/time stamp ("Yes" in decision block 713), then the file is determined again to have expired (act 714), and again the delete indicator 412 is evaluated (decision block 709). Again, if the file delete indicator 412 is set ("Yes" in decision block 709), then the file system entity is deleted (act 710) and the requested operation aborted (act 711). If the delete indicator 412 is not set ("No" in decision block 709), then the requested operation is aborted (act 711) without deleting the file system entity. If the signed long is positive ("No" in decision blocks 705 and 707), and the current time is less than the date/time stamp ("No" in decision block 715), then the requested operation is permitted to continue (act 715).

Returning to decision block 704, if the supplemental data does not include a validly populated entity time-to-live field 410 ("No" in decision block 704), then it is determined (decision block 716) if the location status of the requestor is either unknown or not otherwise within the list of territories in the territory field 420 ("No" in decision block 716). In that case, a default expiry rule set is used for the operation (act 717) (an "expiry rule set" of FIG. 7 corresponds to a territory field (e.g., 421 through 424) of FIG. 4). For instance, in one embodiment, the territory field 421 might be used in the case of the territory of the requestor either being unknown or not within the other listed territories. If the location of the requestor is a particular location corresponding to an actual territory corresponding to the territory fields ("Yes" in decision block 716), then the expiry rule set for the specific territory is used (act 718). For instance, perhaps territory field 421 corresponds to an unknown location status (i.e., is a default rule set), whereas territory field 422 might correspond to the United Kingdom. In that case, if the requestor was determined to be located within the United Kingdom, then territory field 422 would be used.

In any case, whether through a default rule set (act 717) or through the use of a territory rule set (act 718), a rule set is acquired, and the relevant operation expiry field is acquired. For instance, if the requested operation were a copy operation, and the operation field 510 was for a copy operation. The operation expiry indicator field 511 would be accessed, and evaluated (act 719). This would correspond to act 603 of FIG. 6.

Specifically, if the signed long for the operation expiry indicator field is equal to zero ("Yes" in decision block 720), this means the operation of the file system entity never expires (determination 721) given the requestor's location status, and thus the operation is permitted. On the other hand ("No" in decision block 720), if the signed long is negative ("Yes" in decision block 722), then it is determined that the operation on file system entity has already expired (act 723) given the requestor's location status. In that case, the deletion indicator field (e.g., 512 for operation field 510) is evaluated (decision block 724). If that Boolean is true ("Yes" in decision block 724), then the file system entity is deleted from disk (act 725), and the operation is aborted (act 726). Otherwise, if the Boolean is false ("No" in decision block 724), then the operation is aborted (act 726) without deleting the file system entity (bypassing act 725).

If the signed long is neither zero ("No" in decision block 720), and is not negative ("No" in decision block 722), then the signed long is evaluated as a date/time stamp (act 727). Again, an example of a date/time stamp is a Unix data/time stamp. If the current time is greater than the date/time stamp ("Yes" in decision block 728), then the operation on the file system entity is determined again to have expired (act 729), and again the delete indicator field 512 is evaluated (decision block 724). Again, if the delete indicator 412 is set ("Yes" in decision block 724), then the file system entity is deleted (act 725) and the requested operation aborted (act 726). If the delete indicator field 512 is not set ("No" in decision block 724), then the requested operation is aborted (act 726) without deleting the file system entity. If the signed long is positive ("No" in decision blocks 720 and 722), and the current time is less than the date/time stamp ("No" in decision block 728), then the requested operation is permitted to continue (act 730).

The principles described herein thus permit data sovereignty and expiry data to be honored at the granularity of a single operation such that operations (and their expirations) upon file system entities (e.g., files) may be limited by the location of the requestor. Furthermore, when the operation is permitted, and a copy of the file system is to be made available, the file system entity environment may be transcoded such that the requesting system may also have access to the location data and the operation expiry data, thereby further enforcing data sovereignty rules with respect to access and expiration.

Having described an example structure of the supplement data with respect to FIG. 4, three specific serialization implementations will now be described with respect to Tables 1A through 3 respectively. Tables 1A and 1B below illustrates a binary file format for the location data. Table 1A illustrates an example file header format. Table 1B illustrates example supporting data structures.

TABLE 1A

| File Header Section | Data type | Value | Notes |
|---|---|---|---|
| Signature | 4 * byte | TIME | Magic file number to identify this metadata file format |
| Version Info | int | 10 | To be read in the form x.y (10 indicates version 1.0) |
| Use Absolute TTL? | Boolean | — | This value determines whether to use Absolute Time-To-Live behavior (true) or a territory-specific ruleset (false) |
| Territory Count | int | n | The total number of territory-specific file operation expiry rules. If the previous field is 'true', then this number will be '0' |
| [Absolute Time-To-Live] | ttl_struct | | Only present if 'Use Absolute TTL' equals 'true' |
| [Territory rule set] * n | geo_struct | | If 'Use Absolute TTL' equals 'false', then there will be one geo_struct for each territorial rule set defined (up to the maximum defined 'Territory Count') |

TABLE 1A-continued

| File Header Section | Data type | Value | Notes |
|---|---|---|---|
| [Default rule set] | def_struct | | If 'Use Absolute TTL' equals 'false', there will be a def_struct to represent the default rule set to use if a territory is not defined in the previous collection of geo_struct |

TABLE 1B

Supporting data types

| Type name | Field Name | Data type | Notes |
|---|---|---|---|
| ttl_struct | | | If present, this determines a file's absolute time-to-live |
| ttl_struct | Time Stamp | signed long | A negative value indicates that a file has already expired. A zero value indicates that a file will never expire. A positive number represents a unix date/timestamp. Once this date/timestamp has passed, this file will no longer be eligible for any file operation other than deletion. |
| ttl_struct | Delete on expiry | bool | This determines whether the operating system should physically delete the file from disk (without any intermediary recovery data stores - Eg. The recycling bin) |
| geo_struct | | | If present, this represents a file operation expiry rule set that applies to a specific territory |
| geo_struct | Territory | int | Refers to a UN numeric country code (Eg. 826 is the United Kingdom), used to provide territorial context for the file operation expiry rules in this struct |
| geo_struct | Delete on expiry | bool | This determines whether the operating system should physically delete the file from disk if a given operation expires |
| geo_struct | Copy expiry | signed long | A negative value indicates that this operation can never occur. A zero value indicates that this operation can never expire. A positive value is a unix date/timestamp which represents the deadline after which copy operations are no longer permitted in this territory. |
| geo_struct | Read expiry | signed long | A negative value indicates that this operation can never occur. A zero value indicates that this operation can never expire. A positive value is a unix date/timestamp which represents the deadline after which read operations are no longer permitted in this territory. |
| geo_struct | Update expiry | signed long | A negative value indicates that this operation can never occur. A zero value indicates that this operation can never expire. A positive value is a unix date/timestamp which represents the deadline after which update operations are no longer permitted in this territory. Update operations include changes to file timestamps, ownership, metadata and content. |
| geo_struct | Delete expiry | signed long | A negative value indicates that this operation can never occur. A zero value indicates that this operation can never expire. A positive value is a unix date/timestamp which represents the deadline after which delete operations are no longer permitted in this territory |
| def_struct | | | This represents the default file operation expiry rule set to use if a specific territorial rule set cannot be found |
| def_struct | Delete on expiry | bool | This determines whether the operating system should physically delete the file from disk if a given operation expires |

TABLE 1B-continued

Supporting data types

| Type name | Field Name | Data type | Notes |
| --- | --- | --- | --- |
| def_struct | Copy expiry | signed long | A negative value indicates that this operation can never occur. A zero value indicates that this operation can never expire. A positive value is a unix date/timestamp which represents the deadline after which copy operations are no longer permitted in this territory. |
| def_struct | Read expiry | signed long | A negative value indicates that this operation can never occur. A zero value indicates that this operation can never expire. A positive value is a unix date/timestamp which represents the deadline after which read operations are no longer permitted in this territory. |
| def_struct | Update expiry | signed long | A negative value indicates that this operation can never occur. A zero value indicates that this operation can never expire. A positive value is a unix date/timestamp which represents the deadline after which update operations are no longer permitted in this territory. Update operations include changes to file timestamps, ownership, metadata and content. |
| def_struct | Delete expiry | signed long | A negative value indicates that this operation can never occur. A zero value indicates that this operation can never expire. A positive value is a unix date/timestamp which represents the deadline after which delete operations are no longer permitted in this territory. |

Table 2 illustrates a more portable embodiment of the location data using Java-Script Object Notation (JSON).

TABLE 2

```
{
    "EXPIRY" : {
        "version" : 1.0,            // This file must contain one of the [Optional]
                                    // elements below to be valid
        "origin" : 826,             // The country of origin fo this file (UN country
                                    // code. 826 = UK)
        "TTL" : {                   // [Optional] Absolute Time-To-Live
            "timestamp" : "1420070400",    //Signed integer that denotes file expiry
                                    // behaviour
                                    // -1 = File has already expired
                                    // 0 = File never expires
                                    //>0 = Unix timestamp for file expiry (in this
                                    // case 01/01/2015)
            "deleteOnExpiry" : true    // Determines whether to delete this file from the
                                    // filesystem upon expiry. Deletion should NOT
                                    // use intermediary recovery stores
        },
        "expiry" : {                // [Optional] Territory-specific operation expiry
                                    // rules
            "geo_expiry" : [        // This is a list (array) of territories and their
                                    // operation expiry rules
                                    // Only one territory entry is shown for brevity
                {
                    "country": 784,    // The country this specific rule applies to (UN
                                    // country code. 826 = UAE)
                    "deleteOnExpiry" : true,    // Determines whether to delete this file
                                    // from the filesystem upon expiry. Deletion
                                    // should NOT use intermediary recovery stores
                    "copy": "-1",    // Signed integer that governs copy operation
                                    // expiry
                    "read": "1420070400",    // Signed integer that governs read
                                    // operation expiry
                    "update": "-1",    // Signed integer that governs update operation
                                    // expiry
```

TABLE 2-continued

```
            "delete": "0",        // Signed integer that governs delete operation
                                  // expiry
        }
    ],
    "default _expiry" : {         // This is the default operation expiry rule set to
                                  // use if a specific territorial rule set cannot be
                                  // found
        "deleteOnExpiry" : true,      // Determines whether to delete this file
                                  // from the filesystem upon expiry. Deletion
                                  // should NOT use intermediary recovery stores
        "copy": "-1",             // Signed integer that governs copy operation
                                  // expiry
        "read": "1420070400",     // Signed integer that governs read
                                  // operation expiry
        "update": "-1",           // Signed integer that governs update operation
                                  // expiry
        "delete": "0",            //Signed integer that governs delete operation
                                  // expiry
        }
    }
  }
}
```

The following Table 3 shows a portable example of the location data using an eXtensible Markup Language (XML) document.

TABLE 3

```
<?xml version="1.0" encoding="utf-8" ?>
<!-- An XML-based version of time-sensitive metadata -->
<!-- A file must contain one of the [Optional] nodes -->
<TimeMetadata>
    <!-- Metadata version information -->
    <Version>1.0</Version>
    <!-- Country of origin -->
    <Origin>
        <IsoCode>UK</IsoCode>
        <UNCode>826</UNCode>
    </Origin>
    <!-- [Optional] Absolute Time-To-Live -->
    <AbsoluteTimeToLive>
        <!--
            A negative value indicates that this file has already expired.
            A zero-value indicates that this file will never expire.
            A positive value indicates a Unix Date/Timestamp,
            representing the date and time after which file access is no
            longer allowed.
        -->
        <TimeStamp>1420070400</TimeStamp>
        <!-- Determines whether the file should be deleted upon expiry
        -->
        <DeleteOnExpiry>true</DeleteOnExpiry>
    </AbsoluteTimeToLive>
    <!-- [Optional] Territory-specific operation expiry rules -->
    <Expiry>
        <!-- The list of territories and their rule sets -->
        <GeoExpiry>
            <!-- Only one entry is shown at this level for brevity -->
            <Territory>
                <!-- Territorial information -->
                <IsoCode>ZWE</IsoCode>
                <UNCode>716</UNCode>
                <!-- Determines whether to delete the file upon
                operation expiry -->
                <DeleteOnExpiry>true</DeleteOnExpiry>
                <!-- Operation expiry detail for this territory -->
                <Copy>-1</Copy>
                <Read>1420070400</Read>
                <Update>-1</Update>
                <Delete>0</Delete>
            </Territory>
        </GeoExpiry>
        <!-- The default expiry rule set to use if a specific territory
        cannot be found -->
        <Default>
            <!-- Determines whether to delete the file upon
```

TABLE 3-continued

```
            operation expiry -->
            <DeleteOnExpiry>true</DeleteOnExpiry>
            <!-- Default file operation expiry -->
            <Copy>-1</Copy>
            <Read>1420070400</Read>
            <Update>-1</Update>
            <Delete>0</Delete>
        </Default>
    </Expiry>
</TimeMetadata>
```

Accordingly, a mechanism for preserving sovereignty of data with expiry enforced by territory and operation-specific time-to-live has been described.

CLAIM SUPPORT SECTION

Herein described is a method for controlling access to a file system entity based on location of requestor and operation expiry data of the file. The method includes an act of associating operation expiry data and location data with a file system entity such that the operation expiry data and the location data and the file system entity are moved or copied atomically together; an act of receiving a request to perform an operation on the file system entity; an act of identifying a location status associated with a requestor of the request; an act of identifying expiry data that corresponds to the location status, and that is associated with the requested operation; and an act of using the identified expiry data to determine whether the requested operation is permitted on the file system entity.

The act of associating operation expiry day and location data with the file system entity may include an act of including the operation expiry day and the location data in an alternate data stream of the file system entity. The act of associating operation expiry day and location data with the file system entity comprises may include an act of including the operation expiry day and the location data as one or more properties of the file system entity.

The act of using the identified expiry data to determine whether or not the requested operation is permitted may comprise: an act of determining that the location status of the requestor is unknown; and in response to determining that the location status of the requestor is unknown, an act of accessing a default expiry rule set for the requested operation; and an act of determining whether or not the requested operation may be performed based on the default rule set. When the location status of the requestor is a location of the requestor, the identified expiry data may be included within the associated operation expiry data for the file system entity.

The act of using the identified expiry data to determine whether the requested operation is permitted on the file system entity may comprise: an act of determining an expiry time in the identified expiry data; an act of determining that a relevant time to compare to the expiry time; and an act of determining whether to determine whether the requested operation is permitted based on the comparison of the relevant time to the expiry time.

The act of using the identified expiry data to determine whether the requested operation is permitted on the file system may comprise: an act of interpreting the expiry data as indicating that there is no expiry for the requested operation; and an act of permitting the operation based on the lack of expiry for the requested operation.

The act of using the identified expiry data to determine whether the requested operation is permitted on the file system may comprise: an act of interpreting the expiry data as indicating that the requested operation has expired without reference to an expiry time; and an act of denying the operation based on the expired state for the requested operation.

The method further comprising the following if it is determined that the requested operation is permitted: an act of causing the requested operation to be performed on the file system entity. In that case, the act of causing the requested operation to be performed may comprise: an act of transcoding the file system entity to be a transcoded file system entity that is suitable for an operating system of the requestor. Alternatively or in addition, the act of causing the requested file system entity operation to be performed may comprise: an act of transcoding the file system entity to be in a serialization implementation that is implemented by an operating system of the requestor.

Also described herein is a computer program product comprising one or more computer-readable storage media having thereon one or more computer-executable instructions that are structured such that, when executed by the one or more processors of the computing system, cause the computing system to perform the following in response to receiving a request to perform an operation on a file system entity that is managed by an operating system, the file system entity having operation expiry data and location data associated with the file system entity such that the operation expiry data and the location data and the file system entity are moved or copied atomically together: an act of identifying a location status associated with a requestor of the request; an act of identifying expiry data that corresponds to the location status, and that is associated with the requested operation; and an act of using the identified expiry data to determine whether the requested operation is permitted on the file system entity.

The computer program product may further comprise computer-executable instructions that are structured such that, when executed by the one or more processors of the computing system, cause the computing system to perform the following: an act of identifying whether there is file expiry data associated with file system entity that is the target of the requested test, wherein if the file expiry data is present, the file expiry data is used to determine whether operations on the file are permitted. If operations on the file are not permitted by the file expiry data, file deletion data is referenced to determine whether to delete the file system entity, wherein if the file deletion indicates that the file system entity should be deleted, the file system entity is deleted.

Also herein described is a computing system comprising: one or more computer-readable storage media having thereon a plurality of file system entities managed by an operating system of the computing system, at least a particular file system entity of the plurality of files having associated operation expiry data location data that is associated with the particular file system entity such that the operation expiry data and the location data and the particular file system entity are moved or copied atomically together; and one or more processors. The one or more computer-readable media may have thereon computer-executable instructions that are configured such that, when executed by the one or more processors, cause the computing system to performing the following in response to receiving a request to perform an operation on the particular file system location: an act of identify a location associated with a requestor of the request; and an act of using the location data to determine whether or not the requested file operation is permitted on the particular file system entity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors, for controlling access to a particular file of a plurality of files within a file system, the method comprising:

atomically associating, at the computer system, access control information with the particular file such that when the particular file is independently moved or copied, the access control information and the particular file are moved or copied atomically together, wherein the access control information includes operation expiry data that is correlated with at least one location and at least one file operation type, wherein atomically associating the access control information with the particular file Includes at least one of attaching the access control information to the particular file by using a separate file that contains the access control information for the particular file, or modifying properties of the file to include the control information, or providing or the control information in an alternate data stream;

receiving, at the computer system, an operation request to perform an operation of a particular file operation type on the particular file;

identifying, at the computer system, a location associated with the operation request: identifying within the access control information that is atomically associated with the particular file, at the computer system, the operation expiry data that corresponds to both the location associated with the operation request and the particular file operation type of the operation request; and using, at the computer system, the identified operation expiry data that corresponds to both the location associated with the operation request and the particular file operation type, to selectively permit or, alternatively, deny the requested operation of the particular file operation type on the particular file.

2. The method in accordance with claim 1, wherein atomically associating operation expiry data and location data with the particular file comprises:
including, at the computer system, the operation expiry data and the location data in the alternate data stream of the particular file.

3. The method in accordance with claim 1, wherein atomically associating the operation expiry data and location data with the particular file comprises including the operation expiry data and the location data as one or more properties of the particular file.

4. The method in accordance with claim 1, wherein using of the identified operation expiry data comprises:
determining, at the computer system, that the location is unknown;
in response to determining that the location is unknown, accessing, at the computer system, a default expiry rule set for the requested operation; and
determining, at the computer system, whether to permit or deny the requested operation based on the default rule set.

5. The method in accordance with claim 1, the location being a location of a requestor of the requested operation, the identified operation expiry data being included within the atomically associated operation expiry data for the particular file.

6. The method in accordance with claim 1, wherein using the identified operation expiry data comprises:
interpreting, at the computer system, the operation expiry data as indicating that there is no expiry for the requested operation; and
permitting, at the computer system, the operation based on the lack of expiry for the requested operation.

7. The method in accordance with claim 1, wherein using the identified operation expiry data to determine whether the requested operation is permitted on the particular file comprises:
interpreting, at the computer system, the operation expiry data as indicating that the requested operation has expired without reference to an expiry time; and
denying, at the computer system, the operation based on the expired state for the requested operation.

8. The method in accordance with claim 1, the method further comprising the following when it is determined that the requested operation is permitted:
causing, at the computer system, the requested operation to be performed on the particular file.

9. The method in accordance with claim 8, the causing of the requested operation to be performed comprising:
transcoding, at the computer system, the particular file to be a transcoded file that is suitable for an operating system of a requestor of the requested operation.

10. The method in accordance with claim 8, the causing of the requested operation to be performed comprising:
transcoding, at the computer system, the particular file to be in a serialization implementation that is implemented by an operating system of a requestor of the requested operation.

11. The method of claim 1, wherein atomically associating the access control information with the particular file includes attaching the access control information to the particular file by using the separate file a side file such that the separate file containing the access control information for the particular file and the particular file are atomically moved or copied together.

12. The method of claim 1, wherein moving or copying the particular file a particular location requires moving or copying the access control information to the particular location.

13. The method of claim 1, wherein atomically associating the access control information with the particular file comprises modifying the particular file so that the particular file is moved or copied atomically together with the access control information.

14. The method of claim 1, wherein atomically associating access control information with the particular file includes modifying the particular file to include the access control information within the particular file.

15. A computer program product comprising one or more computer-readable storage media having thereon one or more computer-executable instructions that are structured such that, when executed by the one or more processors of the computing system, cause the computing system to perform the following in response to receiving an operation request to perform an operation of a particular file operation type on a particular file within a plurality of files that are managed by an operating system, the particular file having access control information atomically associated with the particular file such that when the particular file is independently moved or copied, the access control information, and the particular file are moved or copied atomically together, the access control information comprising at least one operation expiry data that, is correlated with at least one location and at least one file operation type, wherein the access control information is atomically associated with the particular file by at least one of: a separate file that contains the access control information for the particular file, or properties of the file that include the control information, or an alternate data stream of the file that contains the access control information;
identifying, at the computing system, a location status associated with the operation request;
identifying within the access control information atomically associated with the particular file, at the computing system, the operation expiry data that corresponds to both the location associated with the operation request, and the particular file operation type of the operation request; and
using, at the computer system, the identified operation expiry data that corresponds to both the location associated with the operation request and the particular file operation type, to permit or deny the requested operation of the particular file operation type on the particular file.

16. The computer program product in accordance with claim 15, further comprising computer-executable instructions that are structured such that, when executed by the one or more processors of the computing system, cause the computing system to perform the following:
identifying, at the computing system, whether there is operation expiry data associated with particular file that is the target of the requested operation, wherein if the operation expiry data is present, the operation expiry data is used to determine whether operations on the particular file are permitted.

17. The computer program product in accordance with claim 16, wherein when operations on the particular file are not permitted by the operation expiry data, file deletion data is referenced to determine whether to delete the particular file, wherein if the file deletion indicates that the particular file should be deleted, the particular file is deleted.

18. A computing system comprising:
one or more computer-readable storage media having thereon a plurality of file system entities managed by an operating system of the computing system, at least a particular file system entity of the plurality of file system entities having access control information atomically associated with the particular file system entity such that when the particular file system entity is independently moved or copied, the access control information and the particular file system entity are moved or copied atomically together, the access control information comprising at least one operation expiry data that is correlated with at least one location and at least one file operation type, wherein the access control information is atomically associated with the particular file by at least one of: a separate file that contains the access control information for the particular file, or properties of the file that include the control information, or an alternate data stream of the file that contains the access control information; and
one or more processors;
the one or more computer-readable media further having thereon computer-executable instructions that are configured such that, when executed by the one or more processors, cause the computing system to perform the following in response to receiving an operation request to perform an operation of a particular file operation type on the particular file system entity:
identify, at the computing system, a location associated with the operation request;
identifying, at the computer system, within the access control information atomically associated with the particular file system entity, the operation expiry data that corresponds to both the location associated with the operation request and the particular file operation type of the operation request; and
using, at the computer system, the expiry data that corresponds to both the location associated with the operation request and the particular file operation type, to permit or deny the requested operation of the particular file operation type on the particular file system entity.

19. The computing system in accordance with claim 18, the particular file system entity being an individual file.

\* \* \* \* \*